United States Patent [19]

Morton et al.

[11] 3,867,003

[45] Feb. 18, 1975

[54] SEMI-CONDUCTOR CLAMPING MEANS

[75] Inventors: John Morton, Hazel Grove; Keith Drummond Stevens, Marple; Graham Spencer Thexton, Marple Bridge, all of England

[73] Assignee: Cableform Limited, Cheshire, England

[22] Filed: May 30, 1973

[21] Appl. No.: 365,150

[30] Foreign Application Priority Data

June 8, 1972 Great Britain .................... 26670/72

[52] U.S. Cl. ........ 339/92 R, 174/15 R, 174/DIG. 5, 317/234 A, 339/112 R

[51] Int. Cl. ............................................ H01r 13/54

[58] Field of Search ...................... 339/92, 112, 265; 174/DIG. 5, 15 R; 317/234 A

[56] References Cited

UNITED STATES PATENTS

| | | | |
|---|---|---|---|
| 2,819,435 | 1/1958 | Connell | 317/234 A |
| 2,866,928 | 12/1958 | Blundell | 174/DIG. 5 |
| 3,027,535 | 3/1962 | Persson | 339/92 M |
| 3,619,473 | 11/1971 | Meyerhoff | 174/DIG. 5 |
| 3,654,528 | 4/1972 | Barkan | 174/15 R |

FOREIGN PATENTS OR APPLICATIONS

| | | | |
|---|---|---|---|
| 295,228 | 2/1954 | Switzerland | 317/234 A |

OTHER PUBLICATIONS

Wakefield Bulletin No. 130A, 6–1969, pp. 1–8.

*Primary Examiner*—Joseph H. McGlynn
*Attorney, Agent, or Firm*—Holman & Stern

[57] ABSTRACT

A clamping means for clamping a semi-conductor device between two heat sink clamping pieces, comprise a plurality of bolts holding the clamping pieces together through the intermediary of a plurality of disc spring washers and insulation pieces, the disc spring washers having a saturation characteristic such that above a certain deflection further deflection does little to increase the spring force.

6 Claims, 1 Drawing Figure

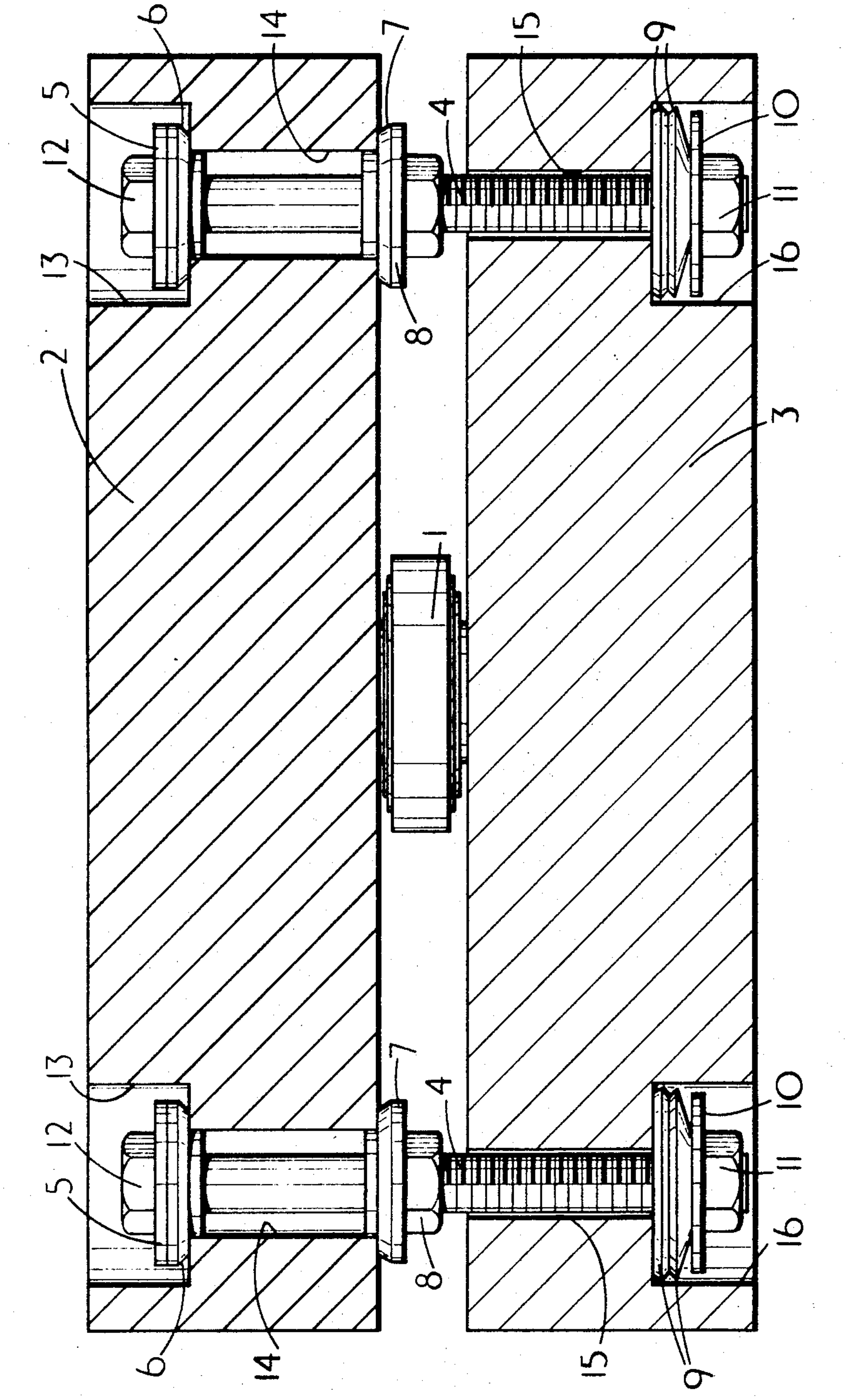
1
2
3
4
5
6
7
8
9
10
11
12
13
14
15
16

SEMI-CONDUCTOR CLAMPING MEANS

BACKGROUND OF THE INVENTION

1. Field of the Invention

This invention relates to means for clamping semi-conductors, such as heavy duty thyristors and diodes, to a heat sink or between two heat sink pieces.

2. Description of the Prior Art

Typically, a heat sink comprises two thick pieces of aluminium, say up to an inch thick, between which the semi-conductor device is clamped with a force which may be of the order of 2,500 lbs. It is essential that a good intimate contact is obtained between the heat sink pieces and the semi-conductor and this requires that the pieces are clamped parallel to each other within the tolerance limit to which the corresponding semi-conductor surfaces are parallel. The heat sink pieces generally need to be insulated from each other since they represent the terminal contacts of the semi-conductor.

An existing clamping means comprises two bolts passing through two holes in each heat sink piece and arranged diametrically in relation to the semi-conductor and close to it. On the side remote from the semi-conductor of one of the pieces there is an insulator, and a pressure pad having a knife edge across which extends a laminated spring the ends of which have holes through which the bolts also pass so that tightening the bolts applies pressure through the spring and pressure pad to clamp the semiconductor between the two heat sink pieces. To obtain the correct clamping force a gauge is used which indicates the bending deflection of the spring. Such a clamping means is expensive and bulky, particularly in height. To obtain a low profile design it is therefore necessary to let the clamping device into the heat sink thus removing heat sink material in the immediate vicinity of the semi-conductor. This results in a substantial increase in the transient thermal impedance and also reduces the effectiveness of the peripheral heat sink material due to a constriction effect, thus increasing the steady state thermal impedance. Additionally the clamping device offers little restriction to relative rotational movement of the heat sink pieces, other than the limited friction force between the heat sink pieces and the semi-conductor, because the securing bolts are not very widely spaced in odder to limit the bulk of the clamping device.

SUMMARY OF THE INVENTION

An object of the invention is to provide an improved clamping means.

According to the invention, there is provided a clamping means for clamping a semi-conductor device between two heat sink clamping pieces, comprising a plurality of bolts holding the clamping pieces together through the intermediary of a plurality of disc spring washers and insulation pieces, the disc spring washers having a saturation characteristic such that above a certain deflection further deflection does little to increase the spring force.

The force on the semi-conductor is the sum of the plurality of balanced moments. The bolts are fitted as far away as possible from the semi-conductor to reduce distance errors and the spring washers give a prescribed load which is substantially independant of deflection so that no gauges or torque spanners are required.

The spring washers and insulators may be let into the heat sink material to further lower the profile but then only a small amount of material is removed and because the bolts are well spaced from the semi-conductor device the removal is from an area which is not critical to the thermal characteristics.

Since the bolts can be widely spaced, even to the extremities of the heat sink pieces, then for a given clearance between bolts, insulators and the heat sink pieces, the possible relative rotational movement of the pieces is reduced.

If a knife edge type construction is required for other consideration, then the use of selected saturation spring washers either side of the knife edge could remove the need to use a gauge to obtain a correct clamping force.

BRIEF DESCRIPTION OF THE DRAWING

An embodiment of the invention will now be described, by way of example, with reference to the accompanying drawing, which shows a semi-conductor device and clamp, the clamping pieces being shown in section.

DESCRIPTION OF A PREFERRED EMBODIMENT

Referring to the drawing, there is shown a heavy duty semi-conductor 1 such as a thristor or diode capable of handling a current of several hundred amps, which semi-conductor is clamped between two heat sink clamping pieces 2, 3 of aluminium. Each piece is approximately 22 centimetres square and 5 centimetres thick so that the thermal capacity is high and the transident thermal impedance is low. Clamping is by two bolt assemblies widely spaced apart to the point of being close to the edges of the clamping piece 2, 3. Each bolt assembly comprises a bolt 4, a metal flat washer 5, a stepped washer 6 of insulating material, a second insulating stepped washer 7, a nut 8, two disc spring washers 9, a metal flat washer 10 and a nut 11. The head 12 of bolt 4 and the washers 5 and 6 are accommodated in a recess 13 in clamping piece 2, the step of washer 6 locating in the bore 14. Similarly, the step of washer 7 locates in the other end of bore 14 so that bolt 4 is held insulated from clamping piece 2. This is necessary because the clamping pieces are also the terminal connections to the semi-conductor device 1. Each bolt 4 passes through a closer fitting bore 15 in clamping piece 3 and the disc spring washers 9, washer 10 and nut 11 are accommodated in a recess 16.

The clamping arrangement is assembled by fixing each bolt 4 with washers5, 6 and 7 and nut 8 to clamping piece 2, the nut 8 being tightened only sufficient to locate the washers 6 and 7 but allowing the bolt to float for alignment purposes. With the semi-conductor correctly located, the bolts 4 are passed through bores 15, and the washers 9 and 10 and nut 11 are applied to each bolt. The nuts 11 are adjusted until the clamping pieces 2 and 3 are held parallel to each other within the tolerance limits required by the semi-conductor 1 and then the nuts are tightened a predetermined number of turns to deflect the spring washers 9 into the saturation part of their characteristics. Finally, the nuts 8 are tightened.

The semi-conductor 1 is then held under the required pressure as determined by the number of spring washers and their saturation characteristics. The wide spacing of the bolts and their close location in each clamping piece gives good protection against relative rotational movement and maintains the clamping pieces parallel within the tolerance limits.

It will also be seen that no metal is removed in the immediate vicinity of the semi-conductor, so that the transient thermal impedance is kept as high as possible.

What is claimed is:

1. An insulated heat sink clamp assembly for use with a semi-conductor, comprising; a pair of opposed clamping pieces of an electrical and heat conducting material for engagement at opposite sides of the semi-conductor to be clamped therebetween; and force transmitting means positioned within the outer periphery of the clamping pieces for drawing the clamping pieces into intimate contact at opposite faces of the semi-conductor, said force transmitting means comprising a pair of bolt assemblies disposed in spaced relation within and extending transversely through the clamping pieces for flanking relation at opposite side edges of the semi-conductor, means on the bolt assemblies for exerting a predetermined pressure on the semi-conductor, said bolt assemblies including electrical-insulating means thereon for insulating said assemblies from at least one of said clamping pieces, said clamping pieces forming electrical terminals for the semi-conductor to be clamped, said means for exerting a predetermined pressure including disc-spring washer means through which force is transmitted to the clamping pieces and the semi-conductor said spring-disc washer means having deflection saturation characteristics such that a predetermined force is imposed on said semiconductors by said clamping pieces when saturation deflection is reached.

2. The clamp assembly as claimed in claim 1 in which discspring washer means comprises an equal number of nested spring disc-washers on each bolt assembly, an innermost one of said spring-disc washers being in intimate electrical current-conducting relation with one of said clamping pieces.

3. The clamp assembly as claimed in claim 1 in which said clamping pieces are elongated, plate-like elements, said bolt assemblies comprising both located adjacent outer end margins of the plate-like elements so that the bolts are relatively remote from the clamping area of the clamping pieces engagable with the semi-conductor whereby clamping force imposed upon the semiconductor is substantially equalized over the semiconductor.

4. The clamp assembly as claimed in claim 3 in which said clamping pieces include opposed parallel faces having portions engagable at the opposite faces of the semi-conductor, each clamping piece having a pair of mutually parallel, transverse bores normal to the parallel faces, one of each of the bore portions of a clamping piece being co-axial to a bore portion of the other clamping piece, the electrical insulating means of the bolt assemblies including collar portions extending into a bore portion for orienting the bolt assemblies normal to the parallel faces.

5. The clamp assembly as claimed in claim 4 in which said bore portions include an enlarged counter-bore opening into the outer surface of the clamping pieces receiving the head of the bolt within the clamping piece, the bolt assemblies including pairs of nut elements, one nut element mounting the bolt on one clamping piece and the other nut element engaging the spring disc washer means and urging it against the other clamping piece.

6. The clamp assembly as claimed in claim 4 in which the bore portions of the clamping pieces in which the insulated collar portions engage is substantially larger in cross section than the bolt to space the bolt from the clamping piece bore portion and provide a substantial insulating air-gap therebetween, the bore portions of the other clamping piece being substantially complimentary to the cross section of the bolt assembly for assisting in maintaining the parallel relation of the opposed parallel faces of the clamping pieces engaging a semi-conductor.

* * * * *